United States Patent [19]

Fowler

[11] 4,427,643
[45] Jan. 24, 1984

[54] METHOD AND APPARATUS FOR GENERATING HIGH PH LIMEWATER

[75] Inventor: David P. Fowler, Irving, Tex.

[73] Assignee: Frito-Lay, Inc., Dallas, Tex.

[21] Appl. No.: 386,407

[22] Filed: Jun. 8, 1982

[51] Int. Cl.³ .............. C01B 5/00; C01B 13/14; C01F 11/02
[52] U.S. Cl. .................... 423/580; 423/636; 423/640; 423/658.5; 422/62; 436/55; 99/323.5; 426/649; 210/716; 210/743; 210/96.1; 210/282
[58] Field of Search ............... 210/716, 717, 743, 807, 210/94, 95, 96.1, 282; 423/636, 580, 637, 640, 658.5; 426/648, 649, 626; 422/62; 436/55

[56] References Cited

U.S. PATENT DOCUMENTS

| | | | |
|---|---|---|---|
| 671,353 | 4/1901 | Reeves | 210/716 |
| 2,308,612 | 1/1943 | Lehmkuhl | 210/282 |
| 3,044,587 | 7/1962 | Sable | 423/640 |
| 3,932,279 | 1/1976 | Yocum | 210/96.1 |
| 4,033,871 | 7/1977 | Wall | 210/96.1 |
| 4,116,834 | 9/1978 | King | 210/96.1 |
| 4,234,425 | 11/1980 | Leo | 210/94 |
| 4,320,004 | 3/1982 | Schecter | 210/282 |
| 4,366,142 | 12/1982 | Kojima | 423/640 |
| 4,368,123 | 1/1983 | Stanley | 210/282 |
| 4,378,293 | 3/1983 | Duke | 210/282 |

FOREIGN PATENT DOCUMENTS 55-109224 8/1980 Japan .................. 423/640

*Primary Examiner*—Ernest G. Therkorn
*Attorney, Agent, or Firm*—Bernard, Rothwell & Brown

[57] ABSTRACT

This invention relates to a method and apparatus for producing high pH water containing dissolved lime by forcing potable water through a column of powdered lime supported on a porous support without transporting significant quantities of lime out of the column. Two or more columns may be connected in parallel to permit recharging of one while the other remains on stream.

7 Claims, 2 Drawing Figures

METHOD AND APPARATUS FOR GENERATING HIGH PH LIMEWATER

BACKGROUND OF THE INVENTION

1. Field of the Invention

This invention relates to improvements in a method and appartus for producing high pH water containing dissolved lime.

2. Prior Art

The preparation of corn for use as a snack food usually requires that the kernels of corn be cooked or processed in water to which lime has been added to blanch the corn and remove undesirable hull material. To accomplish this, undissolved lime is added directly to water in which the corn is to be cooked or processed. An excess of lime is frequently used since it is a low cost material and an excess does not cause any deleterious effects to the corn product. Because the quantity of lime placed in the cooling or processing equipment is not monitored carefully, undissolved lime is often present which tends to build up in the system. This build-up of lime interferes with temperature monitoring equipment in the cooking system which makes proper processing of the corn difficult. In addition, excess lime is destructive to packing and sealing material in the corn processing equipment and in pumps used in the system. Finally, the excess lime contained in water discharged from the cooking system presents environmental hazards that should be avoided.

Thus the prior art called for the deliberate use of excess lime to guarantee adequate pH levels because lime is a low cost material and an excess amount did not adversely affect the finished product due to the thorough washing of the product after working in lime water. However, excess lime has a deleterious effect on process equipment and is a pollutant in plant effluent.

SUMMARY OF THE INVENTION

To overcome these disadvantages and problems of the prior art this invention provides a method for producing high pH water containing no significant amounts of undissolved lime for treating corn, by passing potable water through particles of lime contained in a column. The column is a vertical cylindrical and transparent vessel with leakproof removable end caps. Suitable piping is connected to pass filtered potable water to the lower end of the vessel and remove high pH lime water from the top of the vessel. A porous plate fitted in the bottom of the vessel supports the charge of lime. Two or more vessels may be connected in parallel with piping and valving to allow recharging one vessel with lime while the other remains on stream. A pH probe in the discharge line connected to a monitor may be used to control automatic functions such as flow, shut down and change over.

DETAILED DESCRIPTION OF THE INVENTION

Figure 2:
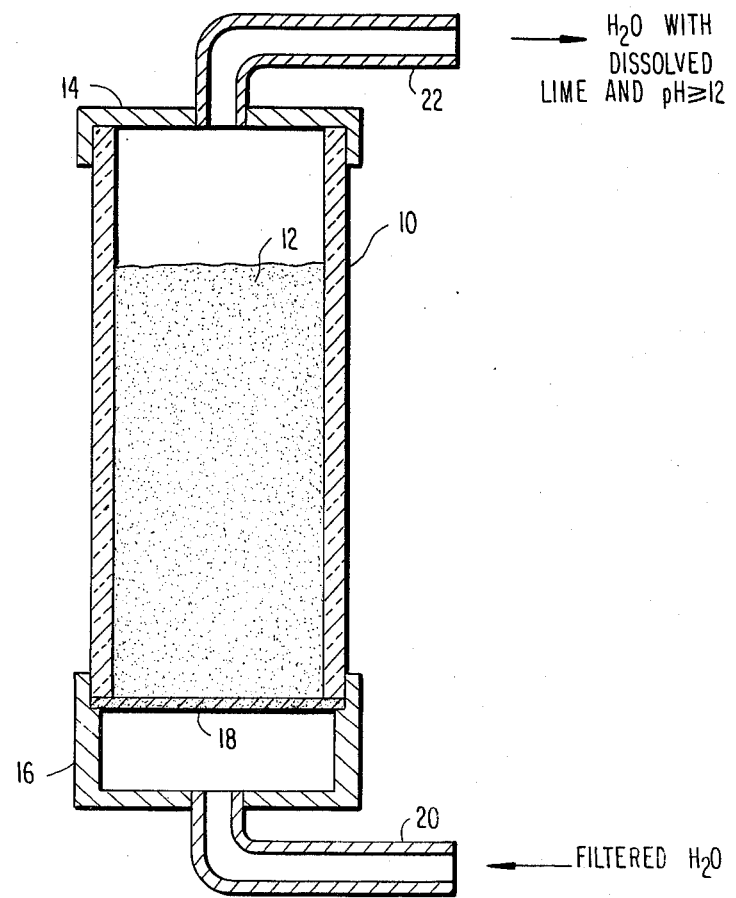
FIG. 2 is a sectional elevation schematically illustrating an apparatus which may be used in the present invention for producing high pH water containing dissolved lime.

This invention provides water containing dissolved lime and having a pH of 12 or greater in which corn may be processed or cooked before being made into a snack product. This high pH limewater may be produced by equipment such as that illustrated in FIG. 2 which includes a column 10 which contains a bed of powdered lime 12.

The column 10 is vertical cylindrical and transparent. It has a top end cap 14 and a bottom end cap 16. A porous support member 18 is provided at the bottom of the column to support the lime. Due to the small sizes of the tortuous passages in the porous support plate 18 water exits at very uniform velocity over the entire surface. The bed 12 of powdered lime ($Ca[OH]_2$) of suitable depth and particle size, e.g. about 100 mesh is supported on member 18.

Water enters the column through pipe 20 and is forced upward by pressure created by a source not shown. The water is forced upward through the porous support member 18 and through the lime particles 12 at a controlled fluid velocity. The force applied to the water is adjusted to insure that the water flows through the lime particles at a rate which is below the transport velocity of the lime particles so that undissovled lime solids are not entrained and carried out of the bed. Thus, water moves upward through the lime particles at a substantially uniform rate and when the water reaches the outlet, it does not contain significant amounts of undissolved lime. After the water reaches the top of the column it is removed through pipe 22 by water removal means not shown. The depth of the lime bed is such that the maximum amount of lime can be dissolved to achieve the highest pH practical in the outflow.

As the water leaves the column it is preferably passed through a pH monitor which senses the pH of the water leaving the column. The water from the column is placed into a blancher or cooker where corn is processed. Since the water contains only dissolved lime and is at a pH of about 10 to 14 as a result of moving through the column of lime, no additional undissolved lime needs to be added to the cooking or processing solution. As a result, the build-up of undissolved lime in the processing equipment is significantly reduced. This enhances the efficiency of the processing equipment by avoiding any build-up of lime around temperature sensing equipment and reduces wear rates on seals, pumps and other equipment.

The column may be made out of any suitable material which will contain water and will withstand the presence of lime and water mixtures. It is preferably of a transparent material such as clean plastic or glass for visual observation of the lime supply and of the flow characteristics. The support member at the bottom of the column may be made out of any suitable porous material which will permit water flow but hold the line, such as porous stainless steel (sintered stainless steel or woven, calandered and sintered stainless steel wire), plastic (sintered polyethylene, polypropylene, or TFE) or vitrified ceramic material having suitable porosity strength and compatibility with the process chemistry. The contour of this support member may be flat, as illustrated in the FIG. 2, or may be cone-shaped with the narrow end extending upward into the column of lime. The end caps 14, 16 at the top and bottom of the column must be sealed to prevent leakage yet removable to allow an operator to charge the column with lime and to remove exhausted supplies of lime. This may be accomplished by known sealing methods.

Figure 1:
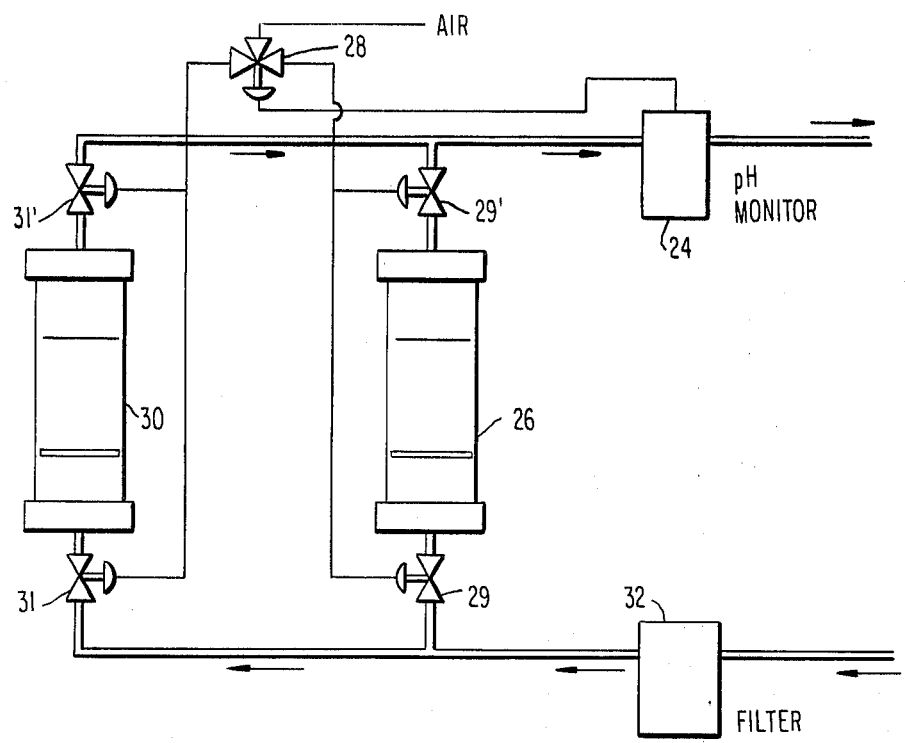
FIG. 1 is a schematic flow diagram illustrating an arrangement of apparatus which may be used in the present invention for continuous operation.

A system for automatically providing a constant supply of water containing dissolved lime at a pH of 12 or more is illustrated in FIG. 1 where two columns 26, 30 (identical to the column of FIG. 2) are connected in parallel to provide a constant supply of water to the processing or cooking equipment. A pH monitor 24 is positioned in the water supply line which senses the pH of the water drawn from the on-stream column, here represented by column 26. A low pH reading would indicate that the lime in the column 26 is becoming exhausted. When a preselected pH is reached which indicates that the supply of lime in the column 26 no longer provides water of the desired pH, a signal is developed at the pH monitor which actuates valve 28. Valve 28 closes valves 29, 29' and opens valves 31, 31' to stop the flow of water from the on-stream column 26 and begins operation from reserve column 30 which contains fresh lime. The pH monitor could sound an alarm at the time of switchover, so that while the reserve column 30 is being used to supply the processing or cooking equipment with high pH water containing dissolved lime, the operator may empty the column 26 of depleted lime and recharge it with new lime. When the water from column 30 reaches the preselected pH, indicating the lime contained therein has been depleted, the pH monitor again develops a signal which is received by the valve. The signal causes the valve 28 to terminate the flow of water from column 30 and to begin removal of water from column 26 which has been recharged. By repeating this cycle, a constant supply of limewater having dissolved lime and a pH of about 10 to 14 and preferably about 12, is supplied to the corn treating equipment (not shown). A filter 32 may be provided to insure that the water is of desirable purity. In addition to controlling the valve swithcing and alarm, the pH monitor can also provide for other automatic functions such as flow control or shutdown.

It will be appreciated by those skilled in the art that the equipment and process described herein could be altered without departing from applicant's invention and the invention is not limited by the specific embodiments disclosed herein. For instance, the water could be allowed to percolate downward through a column containing lime, allowing gravity to provide the force needed to draw the water through the lime particles rather than forcing the water against gravity upward through the column. Forcing the water upward through the lime is preferred, however, because grvity acting on undissolved lime particles on the water then tends to keep the lime particles in the column rather than moving out of the column with the water. The upward movement of the water through the lime therefore provides a high pH limewater having less undissolved lime than would be provided by a system that allows the water to move downward through a column containing lime.

It can be seen that this invention reduces lime usage and the adverse effects that excess lime deposits can have on process equipment, such as plugging openings, insulating temperature sensing elements and causing obvious wear in pump seals, shaft packings and the like. The invention also eliminates the use of excess lime which is a disposal problem and a pollutant in plant effluent. The automated system reduces the use of too much or too little lime in the process.

It is claimed:

1. A method for producing high pH water containing no significant amounts of undissolved lime, comprising: providing a closed vessel capable of holding water under pressure and having no moving components therein, but containing a column of powdered lime; supporting the column of powdered lime on a solid porous support in the vessel; passing potable water upward under pressure through the porous support and through the particles of powdered lime contained in the column; and controlling the velocity of the potable water passing upward through the column of lime at a rate below the transport velocity for said particles of lime.

2. A method for producing high pH water as recited in claim 1 wherein said powdered lime is approximately 100 mesh.

3. An apparatus for producing high pH water and having no moving components therein comprising,
   (a) a vessel having closed sides and removable top and bottom caps and containing a column of powdered lime;
   (b) a solid porous support member for supporting the column of powdered lime at the bottom of said vessel;
   (c) means for introducing and forcing water upward under pressure through said porous support member and through said powdered lime from the bottom of said vessel at a controlled velocity; and
   (d) means for removing high pH water at the top of said vessel.

4. An apparatus for producing high pH water as in claim 3, wherein said caps are in sealed relationship with the vessel.

5. An apparatus for producing high pH water as in claim 3 wherein the porous support member is flat.

6. An apparatus for producing the high pH water as in claim 3 wherein the sides of the column are transparent.

7. An apparatus for continuously producing high pH water comprising,
   (a) at least two vessels each having closed sides and removable top and bottom caps and containing a column of powdered lime;
   (b) piping means connecting the vessels in parallel so that one of the vessels may be used to supply high pH water while the remaining vessel is in reserve;
   (c) a solid porous support for the column of lime at the bottom of each of the vessels;
   (d) means for forcing potable water upward under pressure through the porous support and through the column of powdered lime from the bottom of said vessels;
   (e) means for removal of high pH water at the top of the vessels;
   (f) a pH monitor for monitoring the pH of the water removed from the vessels and for developing a signal when said pH monitor detects a preselected pH in said water; and
   (g) means actuated by a signal developed by the pH monitor for stopping the flow of water from one of the two vessels and starting the flow of water from another vessel.

* * * * *

UNITED STATES PATENT AND TRADEMARK OFFICE
CERTIFICATE OF CORRECTION

PATENT NO. : 4,427,643

DATED : January 24, 1984

INVENTOR(S) : David P. Fowler

It is certified that error appears in the above-identified patent and that said Letters Patent is hereby corrected as shown below:

Column 1, line 21, delete "cooling" and insert therefor -- cooking --.

Column 3, line 51, delete "grvity" and insert therefor -- gravity --.

Column 3, line 52, delete "on" (second occurrence) and insert therefor -- in --.

Column 4, line 39, delete "the".

Signed and Sealed this

Sixth Day of November 1984

[SEAL]

Attest:

GERALD J. MOSSINGHOFF

*Attesting Officer*  *Commissioner of Patents and Trademarks*